| (12) | United States Patent | (10) Patent No.: US 10,476,375 B2 |
|---|---|---|
| | Choudhury et al. | (45) Date of Patent: *Nov. 12, 2019 |

(54) MULTIPLE OUTPUT INTEGRATED POWER FACTOR CORRECTION

(71) Applicant: TEXAS INSTRUMENTS INCORPORATED, Dallas, TX (US)

(72) Inventors: Shamim Choudhury, Katy, TX (US); Zhenyu Yu, Sugar Land, TX (US); Zhong Ye, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 54 days.

This patent is subject to a terminal disclaimer.

(21) Appl. No.: 15/876,351

(22) Filed: Jan. 22, 2018

(65) Prior Publication Data

US 2018/0145584 A1 May 24, 2018

Related U.S. Application Data

(62) Division of application No. 14/167,945, filed on Jan. 29, 2014, now Pat. No. 9,912,229.

(Continued)

(51) Int. Cl.
*H02M 1/42* (2007.01)
*H02M 7/217* (2006.01)
(Continued)

(52) U.S. Cl.
CPC ......... *H02M 1/4208* (2013.01); *H02M 1/088* (2013.01); *H02M 1/4225* (2013.01);
(Continued)

(58) Field of Classification Search
CPC .. H02M 1/4208; H02M 1/4225; H02M 7/217; H02M 1/088; H02M 2001/009; Y02B 70/126; Y10T 307/406
See application file for complete search history.

(56) References Cited

U.S. PATENT DOCUMENTS

| 4,384,321 A | 5/1983 | Rippel |
| 5,559,688 A | 9/1996 | Pringle |

(Continued)

FOREIGN PATENT DOCUMENTS

| CN | 1941588 | 4/2007 |
| CN | 101217255 | 7/2008 |

(Continued)

OTHER PUBLICATIONS

Chinese Office Action and Search Report in corresponding Chinese Patent Application No. 201410822402.X, dated Dec. 13, 2016 (11 pages).

*Primary Examiner* — Pinping Sun
(74) *Attorney, Agent, or Firm* — John R. Pessetto; Charles A. Brill; Frank D. Cimino

(57) ABSTRACT

A multiple-output integrated power factor correction system includes, for example, a processor that is formed in a substrate and is arranged to monitor each voltage output of two or more output stages of a power supply and in response to generate an individual voltage error signal for each monitored output stage. A combined output voltage error signal is generated in response to each of the individual voltage error signals. The voltage input to the power supply and the total inductor current of the power supply are monitored and used to generate a combined output voltage control signal in response to the monitored input voltage total inductor current as well as the combined output voltage error control signal. Each individual output voltage control signal for each monitored output stage is generated in response to each of the respective generated individual voltage error signals.

7 Claims, 6 Drawing Sheets

Related U.S. Application Data

(60) Provisional application No. 61/922,781, filed on Dec. 31, 2013.

(51) Int. Cl.
*H02M 1/088* (2006.01)
*H02M 1/00* (2006.01)

(52) U.S. Cl.
CPC ...... *H02M 7/217* (2013.01); *H02M 2001/009* (2013.01); *Y02B 70/126* (2013.01); *Y10T 307/406* (2015.04)

(56) References Cited

U.S. PATENT DOCUMENTS

| | | | |
|---|---|---|---|
| 6,049,473 | A | 4/2000 | Jang et al. |
| 6,169,669 | B1 | 1/2001 | Choudhury |
| 6,577,908 | B1 | 6/2003 | Wojsznis et al. |
| 6,853,167 | B2 | 2/2005 | Elek et al. |
| 7,012,413 | B1 | 3/2006 | Ye |
| 7,071,667 | B2 * | 7/2006 | Itohara .................. H02M 3/156 323/222 |
| 7,102,341 | B1 * | 9/2006 | Choudhury ................ G05F 1/70 323/222 |
| 7,205,749 | B2 * | 4/2007 | Hagen ...................... G05F 1/70 323/207 |
| 7,479,772 | B2 | 1/2009 | Zane et al. |
| 7,679,213 | B2 * | 3/2010 | Mino ...................... H02M 1/42 307/151 |
| 7,688,608 | B2 | 3/2010 | Oettinger et al. |
| 7,787,263 | B2 | 8/2010 | Oettinger et al. |
| 7,982,537 | B2 * | 7/2011 | Hayashi ................ H03F 3/3022 330/253 |
| 8,493,754 | B1 * | 7/2013 | Wambsganss ...... H02M 1/4216 323/284 |
| 2002/0188383 | A1 * | 12/2002 | Elek ........................ H02M 1/34 700/297 |
| 2003/0142519 | A1 * | 7/2003 | Walters ................. H02M 3/156 363/89 |
| 2005/0068796 | A1 * | 3/2005 | Morita ................ H02M 1/4225 363/120 |
| 2006/0238029 | A1 * | 10/2006 | Hoon .................... H02M 3/158 307/39 |
| 2007/0025031 | A1 * | 2/2007 | Kwon ............... H02M 3/33561 361/38 |
| 2008/0297067 | A1 * | 12/2008 | Wang ................. H05B 33/0815 315/294 |
| 2009/0021227 | A1 * | 1/2009 | Sase ........................ H02M 1/36 323/238 |
| 2009/0284232 | A1 | 11/2009 | Zhang et al. |
| 2009/0284233 | A1 | 11/2009 | Murdock et al. |
| 2011/0057634 | A1 * | 3/2011 | Kunimatsu ........... H02M 3/156 323/282 |
| 2012/0200331 | A1 | 8/2012 | Karlsson et al. |
| 2012/0307528 | A1 * | 12/2012 | Humphrey ........ H02M 3/33592 363/17 |
| 2013/0003420 | A1 * | 1/2013 | Ye ..................... H02M 3/33515 363/17 |
| 2013/0278059 | A1 * | 10/2013 | Liu ........................ G05F 1/577 307/31 |
| 2013/0307435 | A1 * | 11/2013 | Takagimoto ............ G05F 1/468 315/224 |
| 2015/0349646 | A1 * | 12/2015 | Karlsson ........... H02M 3/33576 363/21.01 |
| 2015/0357815 | A1 * | 12/2015 | Luh ........................... H02J 3/00 307/31 |

FOREIGN PATENT DOCUMENTS

| | | |
|---|---|---|
| CN | 201440634 | 4/2010 |
| CN | 102946188 | 2/2013 |

* cited by examiner

MULTIPLE OUTPUT INTEGRATED POWER FACTOR CORRECTION

CROSS-REFERENCE TO RELATED APPLICATION(S)

This divisional application claims priority to U.S. patent application Ser. No. 14/167,945, filed Jan. 29, 2014, which claims priority to and the benefit of Provisional Application No. 61/922,781, filed Dec. 31, 2013, both applications of which are hereby incorporated herein by reference.

BACKGROUND

Modern electronic systems typically include power supplies that have low power dissipation requirements. These systems often use power factor correction circuitry to increase the efficiency of a power supply. The power factor correction circuitry typically includes sensing multiple input/output signals to regulate the input current and output voltage of a power supply. The regulation of a power supply can thus be used to improve the efficiency of the power supply although there remains room for achieving even higher power factors that are closer to the ideal power factor.

BACKGROUND

Modern electronic systems typically include power supplies that have low power dissipation requirements. These systems often use power factor correction circuitry to increase the efficiency of a power supply. The power factor correction circuitry typically includes sensing multiple input/output signals to regulate the input current and output voltage of a power supply. The regulation of a power supply can thus be used to improve the efficiency of the power supply although there remains room for achieving even higher power factors that are closer to the ideal power factor.

SUMMARY

The problems noted above (e.g., when applied to multiple power factor correction stages) can be solved in large part by a multiple-output integrated power factor correction system. The power factor correction system includes, for example, a processor that is formed in a substrate and is arranged to monitor each voltage output of two or more output stages of a AC-DC (alternating current-direct current) power supply and in response to generate an individual voltage error signal for each monitored output voltage. Each individual output voltage control signal of each respective monitored output stage is generated by a respective individual voltage control loop, where each individual voltage control loop operates in response to a respective generated individual output voltage error signal. A combined output voltage error signal is then generated in response to each of the individual voltage error signals. The voltage input to the power supply and the output stage total inductor current of the power supply are monitored and used to generate a combined output voltage control signal in response to the monitored input voltage total inductor current as well as the combined output voltage error control signal. Each individual output voltage control signal for each monitored output stage is generated in response to each of the respective generated individual voltage error signals.

This Summary is submitted with the understanding that it is not be used to interpret or limit the scope or meaning of the claims. Further, the Summary is not intended to identify key features or essential features of the claimed subject matter, nor is it intended to be used as an aid in determining the scope of the claimed subject matter.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be example of that embodiment, and not intended to intimate that the scope of the disclosure, including the claims, is limited to that embodiment.

Certain terms are used throughout the following description—and claims—to refer to particular system components. As one skilled in the art will appreciate, various names may be used to refer to a component or system. Accordingly, distinctions are not necessarily made herein between components that differ in name but not function. Further, a system can be a sub-system of yet another system. In the following discussion and in the claims, the terms "including" and "comprising" are used in an open-ended fashion, and thus are to be interpreted to mean "including, but not limited to . . . ." Also, the terms "coupled to" or "couples with" (and the like) are intended to describe either an indirect or direct electrical connection. Thus, if a first device couples to a second device, that connection can be made through a direct electrical connection, or through an indirect electrical connection via other devices and connections. The term "portion" can mean an entire portion or a portion that is less than the entire portion. The term "calibration" can include the meaning of the word "test."

Figure 1:
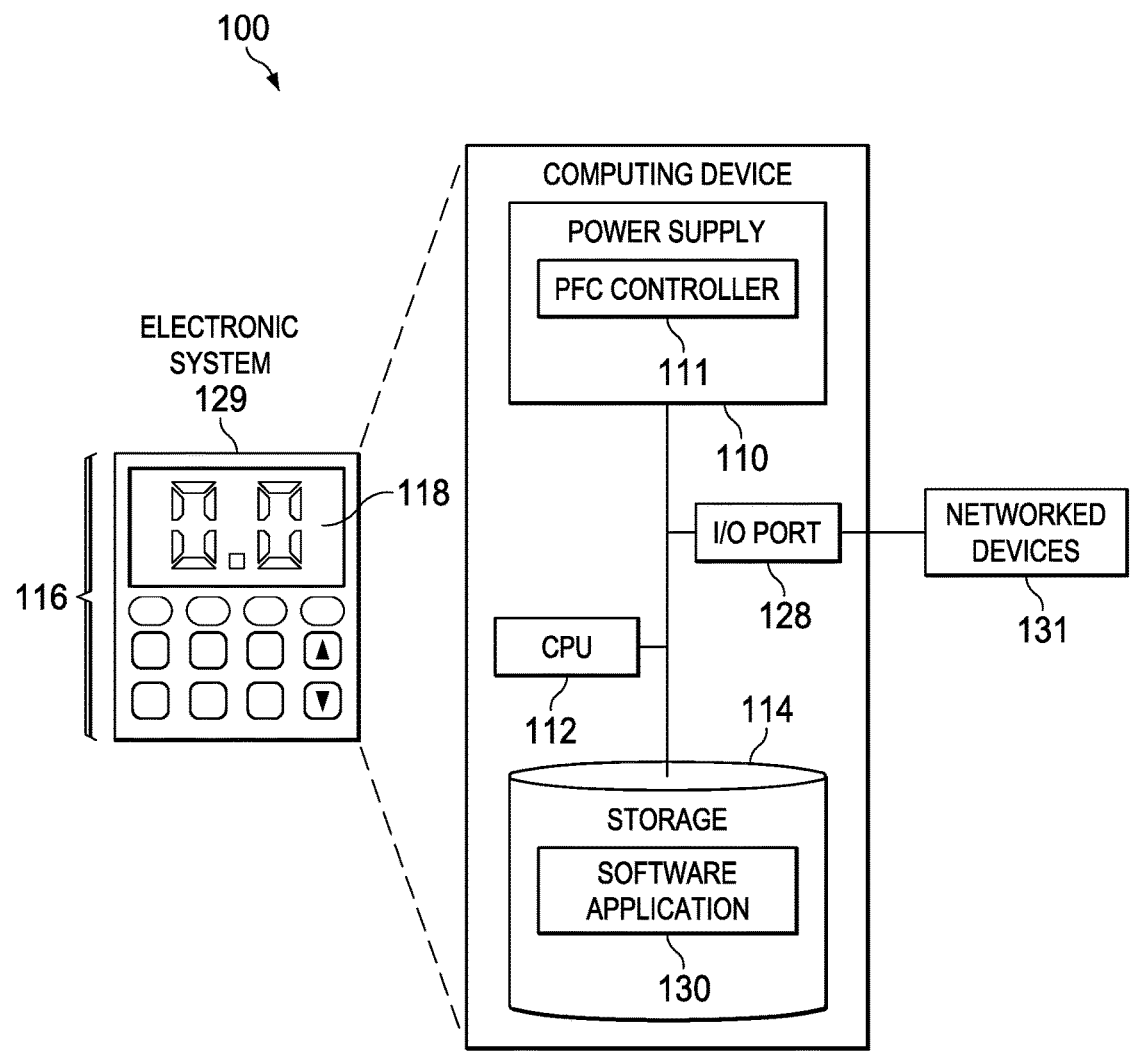
FIG. 1 shows an illustrative electronic device in accordance with example embodiments of the disclosure.

FIG. 1 shows an illustrative computing device 100 in accordance with preferred embodiments of the disclosure. For example, the computing device 100 is, or is incorporated into, an electronic system 129, such as a computer, electronics control "box" or display, communications equipment (including transmitters), or any other type of electronic system arranged to receive an alternating current.

In some embodiments, the computing device 100 comprises a megacell or a system-on-chip (SoC) which includes control logic such as a CPU 112 (Central Processing Unit), a storage 114 (e.g., random access memory (RAM)) and a power supply 110. The CPU 112 can be, for example, a CISC-type (Complex Instruction Set Computer) CPU, RISC-type CPU (Reduced Instruction Set Computer), MCU-type (Microcontroller Unit), or a digital signal processor (DSP). The storage 114 (which can be memory such as on-processor cache, off-processor cache, RAM, flash memory, or disk storage) stores one or more software applications 130 (e.g., embedded applications) that, when executed by the CPU 112, perform any suitable function associated with the computing device 100.

The CPU 112 comprises memory and logic that store information frequently accessed from the storage 114. The computing device 100 is often controlled by a user using a UI (user interface) 116, which provides output to and receives input from the user during the execution the software application 130. The output is provided using the display 118, indicator lights, a speaker, vibrations, and the like. The input is received using audio and/or video inputs (using, for example, voice or image recognition), and electrical and/or mechanical devices such as keypads, switches, proximity detectors, gyros, accelerometers, and the like. The CPU 112 and power supply 110 is coupled to I/O (Input-Output) port 128, which provides an interface that is configured to receive input from (and/or provide output to) networked devices 131. The networked devices 131 can include any device (including test equipment) capable of point-to-point and/or networked communications with the computing device 100. The computing device 100 can also be coupled to peripherals and/or computing devices, including tangible, non-transitory media (such as flash memory) and/or cabled or wireless media. These and other input and output devices are selectively coupled to the computing device 100 by external devices using wireless or cabled connections. The storage 114 can be accessed by, for example, by the networked devices 131.

The power supply 110 is arranged to provide power for use by electronic circuits and systems. The power supply 110 includes a PFC (power factor correction) controller 111 that is arranged to monitor voltages input to and output by the power supply 100 and provide control signals that (e.g., independently) regulate the waveform of each output voltage such that a higher power factor rating is achieved for each output.

A power factor rating can be given as a ratio of the real (e.g., non-reactive power supplied to an electrical circuit) to the apparent power (e.g., consumed by the electrical circuit to which the real power is supplied) of a load. The apparent power can be determined as the product of the root-mean-square of the current and voltage. Conventional power factor correction circuitry typically includes sensing multiple signals that are used to implement the power factor control functionality. In addition, an input bridge rectifier and input filter stage are conventionally used for reducing EMI (electromagnetic interference) and input current ripple. Accordingly, conventional multi output power factor correction circuits would require even higher number of signal sensing, input bridge rectifier and input filter stages. In contrast, the disclosed multiple-output integrated power factor correction system typically is arranged in accordance with high input power factor (PF) and low input current total harmonic distortion (THD) requirements. The multiple-output integrated power factor correction system includes circuitry that controls an input current waveform of the AC-DC power supply in response to the input AC voltage waveform of the AC-DC power supply and, at the same time that maintains a well-regulated output DC voltage. Accordingly, the disclosed multiple-output integrated power factor correction system is arranged to implement control of multi-output power factor circuits without, for example, necessarily having to linearly increase the number of signal sensing stages, input bridge rectifier stages, and the input filter stages.

As discussed below with reference to FIG. 2, the PFC controller 111 uses a digital controller to implement control loops used to shape the output waveforms of the power supply 110. The PFC controller 111 uses independent voltage control loops to independently regulate the output voltages of the power supply 110 while using a single input current sensing signal and single current control loop for shaping the current input that is supplied to a load. The current control loop is arranged to generate a combined output voltage control signal that is used to collectively control multiple PFC output voltage sources (e.g., stages) of the PFC controller 111. The combined output voltage control signal is, for example, a PWM (pulse-width modulated) duty ratio signal.

The PFC controller 111 is further arranged to determine a scaling factor that is used to independently adjust the PWM duty ratio signal for each PFC stage based on an output load condition of the associated voltage output being controlled. The output of each voltage control loop is proportional to the associated output load condition. Accordingly, the voltage loop control outputs are used to calculate each scaling factor used to adjust the collective PWM duty ratio signal.

Figure 2A:
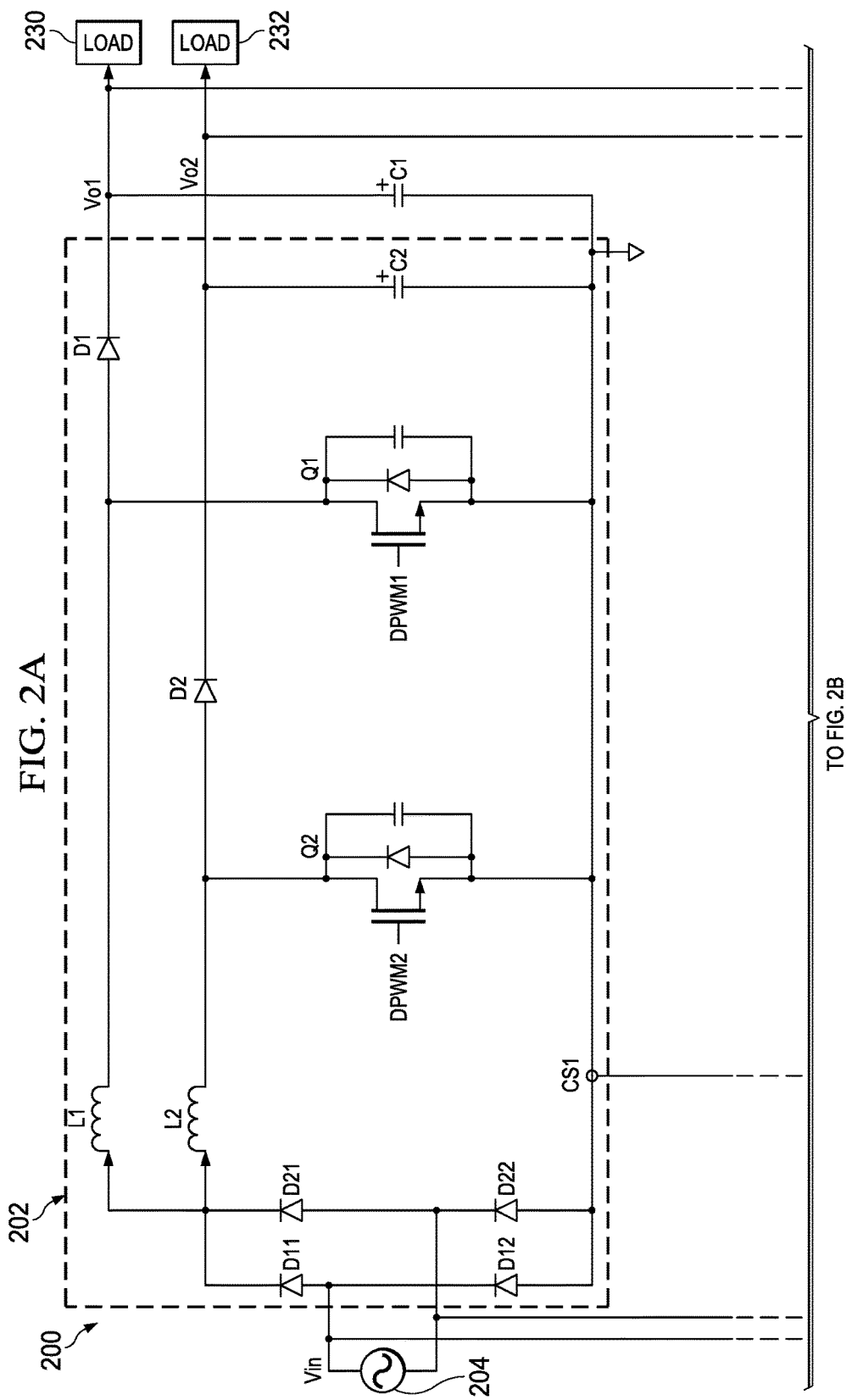
FIG. 2A is a schematic diagram illustrating a multiple-output power factor correction controller circuit in accordance with example embodiments of the disclosure.
Figure 2B:
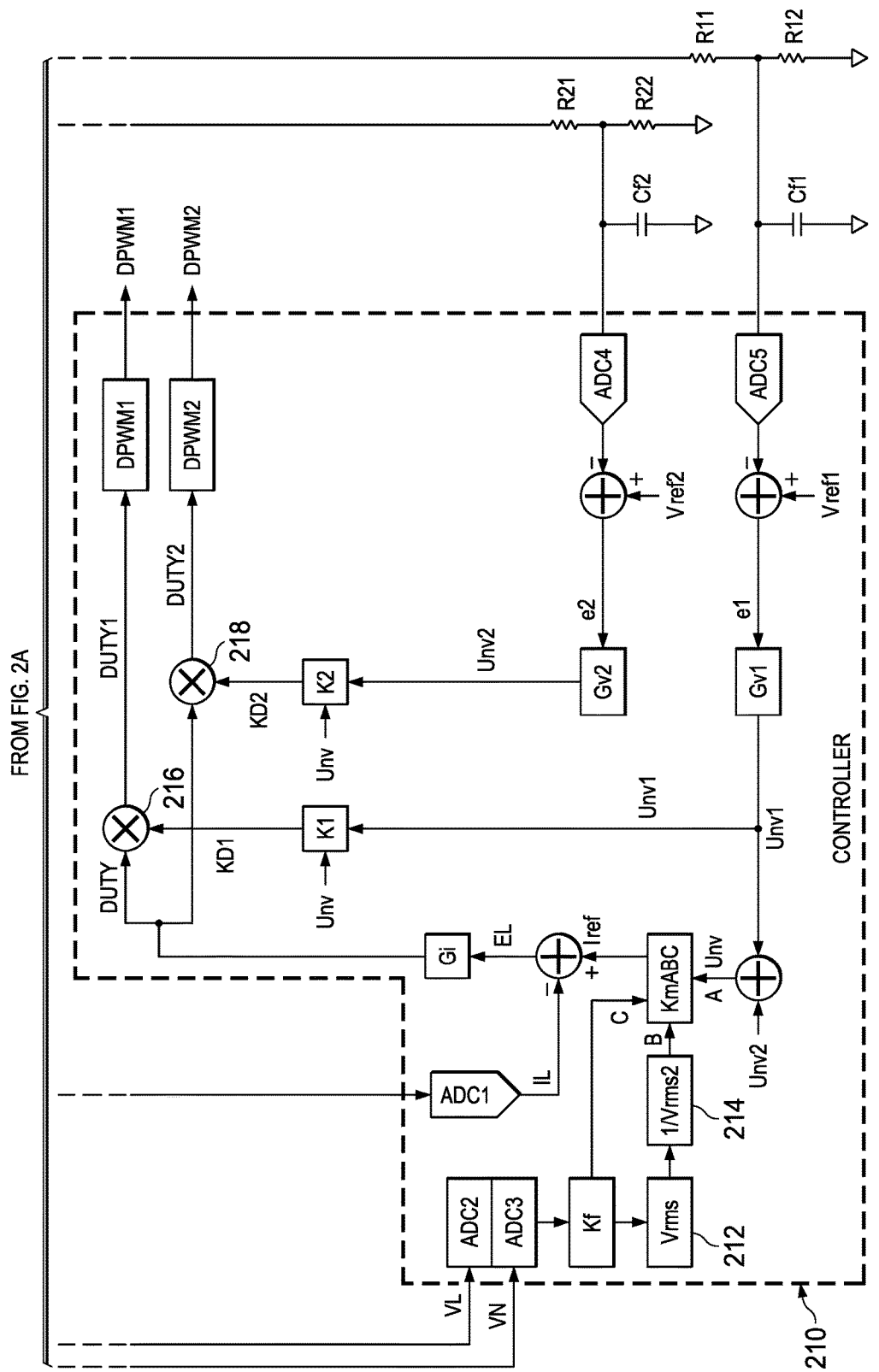
FIG. 2B is a schematic diagram illustrating a multiple-output power factor correction controller circuit in accordance with example embodiments of the disclosure.

FIG. 2 is a schematic diagram illustrating a multiple-output power factor correction controller circuit in accordance with example embodiments of the disclosure. Generally described, the PFC controller circuit 200 includes a power supply 202 and a controller 210. The controller 210 is arranged to monitor a current and voltages of the power supply 202 and to provide control signals used to shape respective waveforms of the output voltages of the power supply 202.

The controller 210 is typically arranged as one or more processors arranged on a common substrate having a constrained number of terminals. For example, a single DSP (or more, for example) can be used to provide the functionality of the various sub-system controllers (such as the voltage loop and current loop controllers described below). Analog components can be used to implement the controller 210, although programming flexibility is provided when a DSP is arranged to executing a program for providing PFC for the power supply 202.

Each such single DSP can be arranged in a single substrate such as a "chip" (or portion of the chip) and/or package where the circuitry of substrate communicates with off-substrate via terminals (such as "pins"). Such terminals provide a constraining influence on a design because of the extra costs associated with each terminal. The per-terminal costs are typically related to various combinations of design components and considerations such as circuitry, area, assembly, signal degradation (e.g., "parasitics"), and the like. A package can contain more than one chip, and it can be seen that the terminal constraints apply for both the chip-level (in inter-chip communication as well as in intra-chip communications between portions of a chip) and package-level. Because of the associated costs, such terminals are kept to a minimum for the controller 210 (and power supply 202) as disclosed herein. The number of terminals on a chip and/or package can be reduced by, for example, time-multiplexing differing quantities through a single terminal (although such multiplexing involves additional circuitry that entails its own set of associated costs). The disclosed techniques can be also used to reduce the associated costs (including processing power/time) of the circuitry used to implement the multiplexed input pin (for example, by reducing the number of signals that are to be multiplexed on terminals).

The power supply 202 is coupled to a power source such as alternating current source 204 that provides power using sinusoidal current and voltages. The power source is coupled to a full-wave rectifier that includes diodes D11, D12, D21, and D22. The "high-side" output of the full-wave rectifier is coupled to an input of an inductor (such as coils L1 and L2). Each such inductor stores electrical field energy for powering an individual voltage output of the power supply 202. The "low-side" output of the full-wave rectifier is coupled to a (e.g., analog) ground to which current sensor CS1 is coupled for the purpose of monitoring the total inductor current of the power supply (e.g., the current carried through modulators Q1 and Q2, as well as through capacitors C1 and C2).

A first output voltage source includes coil L1, diode D1, modulator Q1, and capacitor C1 (capacitor C1, and the like, can be mounted within or outside of power supply 202). Modulator Q1 is responsive to a (for example) digital pulse-width modulation signal (DPWM1) to control a voltage level output by the first voltage source. The DPWM1 signal directs the modulator Q1 to selectively shunt current to ground, which thus selectively lowers and controls the voltage level of the output of the first voltage source. The capacitor C1 is arranged to integrate the voltage level of the output of the first voltage source (thus providing a stable voltage of a direct current), while diode D1 is arranged to isolate the voltage level of the output of the first voltage source from the coil L1 when the voltage level of the output of the first voltage source is higher than the instantaneous voltage level of the coil L1. The output of the first voltage source is coupled to (e.g., for the purpose of providing operational power) load 230.

Likewise, a second output voltage source includes coil L2, diode D2, modulator Q2, and capacitor C2. Modulator Q2 is responsive to a (for example) digital pulse-width modulation signal (DPWM2) to control a voltage level output by the second voltage source. The DPWM2 signal directs the modulator Q2 to selectively shunt current to ground, which thus selectively lowers and controls the voltage level of the output of the second voltage source. The capacitor C2 is arranged to integrate the voltage level of the output of the second voltage source (thus providing a stable voltage of a direct current), while diode D2 is arranged to isolate the voltage level of the output of the second voltage source from the coil L2 when the voltage level of the output of the second voltage source is higher than the instantaneous voltage level of the coil L2. The output of the second voltage source is coupled to (e.g., for the purpose of providing operational power) load 232.

Power supply 202 is, for example, a high-end AC-to-DC (alternating current-to-direct current) power supply used in applications such as servers and telecommunications. Such applications often require the higher degrees of efficiency that result from using power factor correction (PFC) technologies. Conventional PFC solutions employ one voltage loop and one current loop for each PFC controller stage in order to control one voltage source using an average current mode control scheme. Accordingly, each conventional PFC controller stage uses a total of four signal sensing lines in order to provide complete control of the voltage and current loops of the conventional PFC controller.

In contrast, the disclosed multiple-output PFC controller provides, for example, independent control of two PFC control stages using one current sense signal line and four voltage sense signal lines. Thus, a PFC controller that has two control outputs (such as DPWM1 and DPWM2) operates using a total of five sensing signal lines (as compared with the total of eight lines that would otherwise be required when using a conventional PFC controller).

Controller 210 is an example of a multiple output PFC controller having five sensing inputs and two control outputs. For example, the controller 210 includes an analog-to-digital converters ADC1 that is arranged to monitor a current sensing signal from the current sensor CS1, converters ADC2 and ADC3 that are arranged to monitor voltages of the alternating current source 204, and converters ADC4 and ADC5, each of which is respectively arranged to measure the output voltage (e.g., either Vo1 or Vo2) of each voltage source of power supply 202. The functionality illustrated converters can be provided by less converters than shown, by using, for example time-multiplexed inputs on one or more converters. In operation (such as during test, calibration, and/or normal operation), the ADCs are respectively arranged to digitize each of the received input signals and to provide an indication of each input signal by generating a series of digitally coded values that correspond to the magnitude of the input signal at each sampling time.

As mentioned above, controller 210 includes two (or more) two PFC control stages where a first PFC control stage is arranged to receive an indication of a first output voltage of a power supply and, in response, generate a control signal for controlling the first output voltage of the power supply, wherein a second PFC control stage is arranged to arranged to receive an indication of a second output voltage of a power supply and, in response, generate a control signal for controlling the second output voltage of the power supply.

For example, the first PFC control stage output (e.g., voltage output Vo1) is coupled to a filter/divider network (that includes voltage-divider resistors R11 and R12 and filter capacitor Cf1). The filter/divider network is arranged to step-down and integrate the voltage Vo1. The ADC5 is arranged to monitor the output of the filter/divider network and produce a first output voltage quantity that is an indication of the first output voltage of the power supply.

The first output voltage quantity is compared with a first voltage reference (Vref1) that represents, for example a target quantity for the first output voltage quantity. The result of the comparison is expressed as error signal e1. Error signal e1 is provided as an input to a first voltage loop digital controller (Gv1) that is arranged in accordance with the equation:

$$G_{v1}(z) = \frac{U_{nv1}}{E_1} = \frac{b_{01} + b_{11}z^{-1} + b_{21}z^{-2}}{1 - a_{11}z^{-1} - a_{21}z^{-2}} \quad (1)$$

where $U_{nv1}$ is the output of the first voltage loop digital controller and $E_1(n)$ is the error signal e1. The output $U_{nv1}$ for the n-th sample can be expressed in accordance with the equation:

$$U_{nv1}(n) = a_{11}U_{nv1}(n-1) + a_{21}U_{nv1}(n-2) + b_{01}E_1(n) + b_{11}E_1(n-1) + b_{21}E_1(n-2) \quad (2)$$

where $U_{nv1}(n)$ is the output of the first voltage loop digital controller for the n-th sample, $E_1(n)$ is the error input to the first voltage loop digital controller for n-th sample, and the parameters $a_{11}$, $a_{21}$, $b_{01}$, $b_{11}$, and $b_{21}$ are digital controller coefficients selected in accordance with application operating parameters. The output of the first voltage loop digital controller is expressed as signal Unv1 (e.g., the first voltage loop error signal).

Likewise, the output (e.g., voltage output Vo2) of the second PFC control stage is coupled to a filter/divider network (that includes voltage-divider resistors R21 and R22 and filter capacitor Cf2) that is arranged to step-down and integrate voltage Vo2. The ADC4 is arranged to monitor the output of the filter/divider network and produce a second output voltage quantity that is an indication of the second output voltage of the power supply.

The second output voltage quantity is compared with a second voltage reference (Vref1) that represents, for example a target quantity for the second output voltage quantity. The result of the comparison is expressed as error signal e2. Error signal e2 is provided as an input to a second voltage loop digital controller (Gv2) that is arranged in accordance with the equation:

$$G_{v2}(z) = \frac{U_{nv2}}{E_2} = \frac{b_{02} + b_{12}z^{-1} + b_{22}z^{-2}}{1 - a_{12}z^{-1} - a_{22}z^{-2}} \quad (3)$$

where $U_{nv2}$ is the output of the second voltage loop digital controller and $E_2(n)$ is the error signal e2. The output $U_{nv2}$ for the n-th sample can be expressed in accordance with the equation:

$$U_{nv2}(n) = a_{12}U_{nv2}(n-1) + a_{22}U_{nv2}(n-2) + b_{02}E_2(n) + b_{12}E_2(n-1) + b_{22}E_2(n-2) \quad (4)$$

where $U_{nv2}(n)$ is the output of the second voltage loop digital controller for the n-th sample, $E_2(n)$ is the error input to the second voltage loop digital controller for n-th sample, and the parameters $a_{11}$, $a_{21}$, $b_{01}$, $b_{11}$, and $b_{21}$ are digital controller coefficients selected in accordance with application operating parameters. The output of the second voltage loop digital controller is expressed as signal Unv2 (e.g., the second voltage loop error signal).

The outputs of the converters ADC2 and ADC3 (used to monitor voltages of the alternating current source 204) are provided to the input voltage sensing gain controller (Kf). Controller Kf is arranged in accordance with the equation:

$$K_f = \frac{1}{V_{max(pk)}} \quad (5)$$

where $K_f$ is gain of the controller Kf and $V_{max(pk)}$ is the maximum value of the sensed input voltage. Accordingly, (for example) the output C (e.g., for an n-th sample) of the controller Kf (e.g., for the n-th sample) can be determined by multiplying the gain $K_f$ by the value of the sensed input voltage (e.g., for the n-th sample). Signal C is supplied as an input to module KmABC (discussed below).

Module 212 is arranged to a determine root-mean-square voltage (Vrms) value in response to the sensed input voltages (in response to controller Kf and/or converters ADC2 and ADC3, for example). Module 214 is arranged to receive the Vrms value from module 212 and generate signal B. Signal B is the square of the inverse of the Vrms value and is supplied as an input to the module KmABC.

Signal A is calculated as the sum (e.g., combined output voltage error signal Unv) of the outputs of each voltage loop digital controllers. For example, signal A is equal to the value of signal Unv1 plus the value of signal Unv2. Signal A is supplied as an input to the module KmABC.

Module KmABC is arranged to receive the signals A, B, and C, and to generate a current reference signal (Iref) in response. For example, the module KmABC can be arranged in accordance with the equation:

$$Km = \frac{V_{max(pk)}}{V_{min(pk)}} \quad (6)$$

where $V_{max(pk)}$ is the maximum value of the sensed input voltage and $V_{min(pk)}$ is the minimum value of the sensed input voltage. For example, the gain factor Km can be determined where $V_{max(pk)}$ cis the maximum value of the sensed input voltage over multiple cycles of the (AC) input voltage cycles and $V_{min(pk)}$ is the minimum value of each of the peak value of each cycle of the multiple cycles of the sensed input voltage. Thus, the current reference signal can be determined in response to instantaneous input voltages (e.g., signal C), the average voltage of the input voltage (signal B), the combined output voltage error signal (e.g., signal A), and the ratio of the maximum peak voltage to the minimum peak voltage.

The current reference signal Iref is added to a current loop signal IL to determine a combined error loop signal EL. Current loop signal IL is the output of the converter ADC1 that is arranged to monitor a current sensing signal from the current sensor CS1. The combined error loop signal EL is provided as an input to the current loop digital controller Gi.

The current loop digital controller (Gi) is arranged in accordance with the equation:

$$G_i(z) = \frac{U_I}{E_I} = \frac{b_0 + b_1 z^{-1} + b_2 z^{-2}}{1 - a_1 z^{-1} - a_2 z^{-2}} \quad (7)$$

where $U_I$ is the output of the current loop digital controller Gi and $E_I$ is the current error signal EL. The output $U_I$ for the n-th sample can be expressed in accordance with the equation:

$$U_1(n) = a_1 U_1(n-1) + a_2 U_1(n-2) + b_0 E_I(n) + b_1 E_I(n-1) + b_2 E_I(n-2) \quad (8)$$

where $U_I(n)$ is the output of the current loop digital controller for the n-th sample, $E_I(n)$ is the error input to the current loop digital controller for n-th sample, and the parameters $a_{11}$, $a_{21}$, $b_{01}$, $b_{11}$, and $b_{21}$ are digital controller coefficients selected in accordance with application operating parameters. The output of the current loop digital controller is expressed as signal Duty.

Signal Duty is modified in response to each of the individual voltage loop error signals (e.g., Unv1 and Unv2) and collectively by the combined voltage loop error signal (e.g., Unv). For example, the first voltage loop error signal (Unv1) can be modified by the combined voltage loop error signal (Unv) and module K1 to produce signal KD1. Signal KD1 is used to modify signal Duty at multiplier 216, which outputs signal Duty1. Signal Duty1 is coupled to the input of a first duty pulse-width modulation (DPWM1) module. The DPWM1 module is arranged to output a DPWM1 signal that is configured to control the duty cycle of modulator Q1.

Likewise, the second voltage loop error signal (Unv2) can be modified by the combined voltage loop error signal (Unv) and module K2 to produce signal KD2. Signal KD2 is used to modify signal Duty at multiplier 218, which outputs signal Duty2. Signal Duty2 is coupled to the input of a second duty pulse-width modulation (DPWM2) module.

The DPWM2 module is arranged to output a DPWM2 signal that is configured to control the duty cycle of modulator Q2.

Figure 3A:
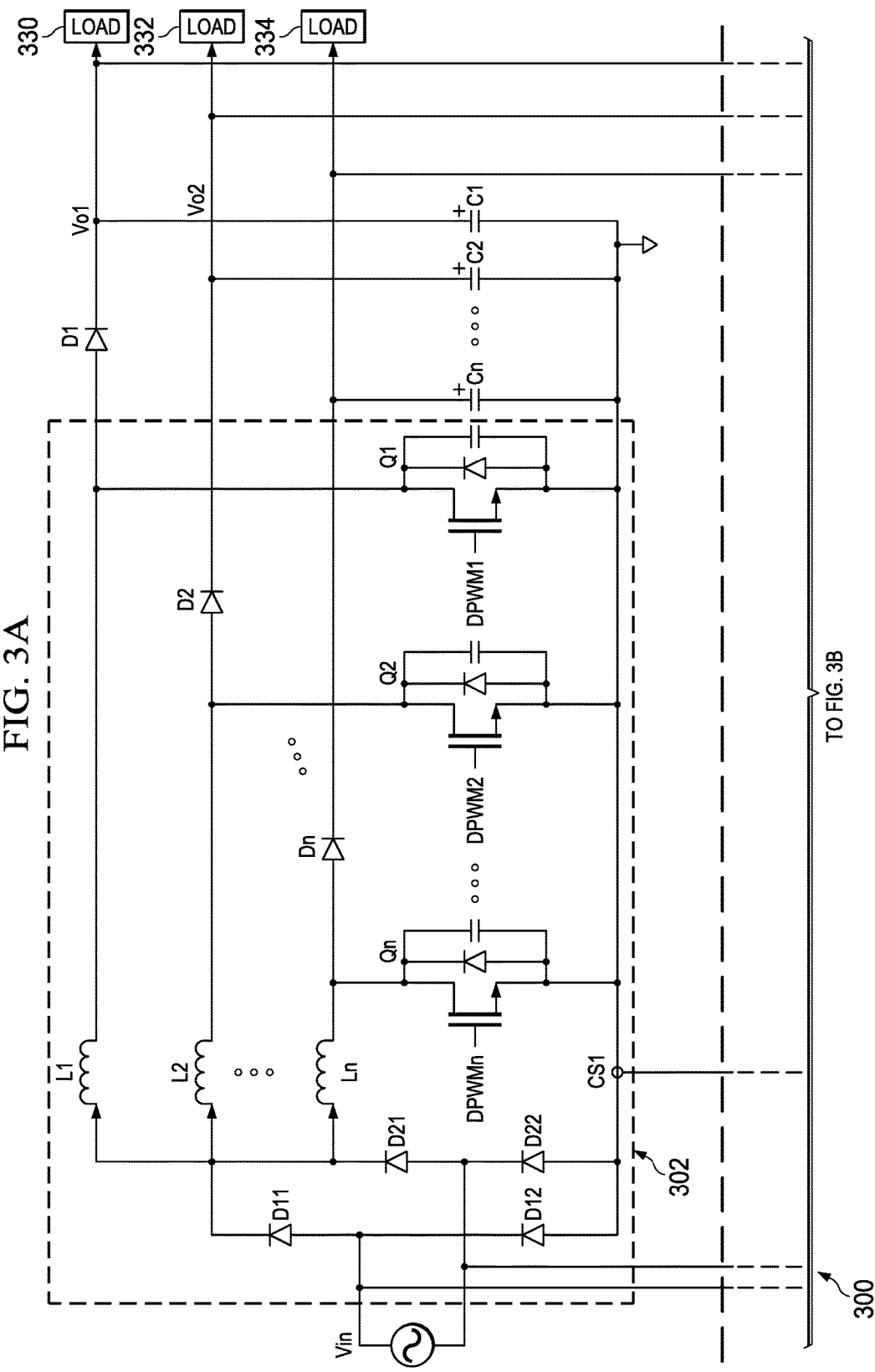
FIG. 3A is a schematic diagram illustrating an n-output power factor correction controller circuit in accordance with example embodiments of the disclosure.
Figure 3B:
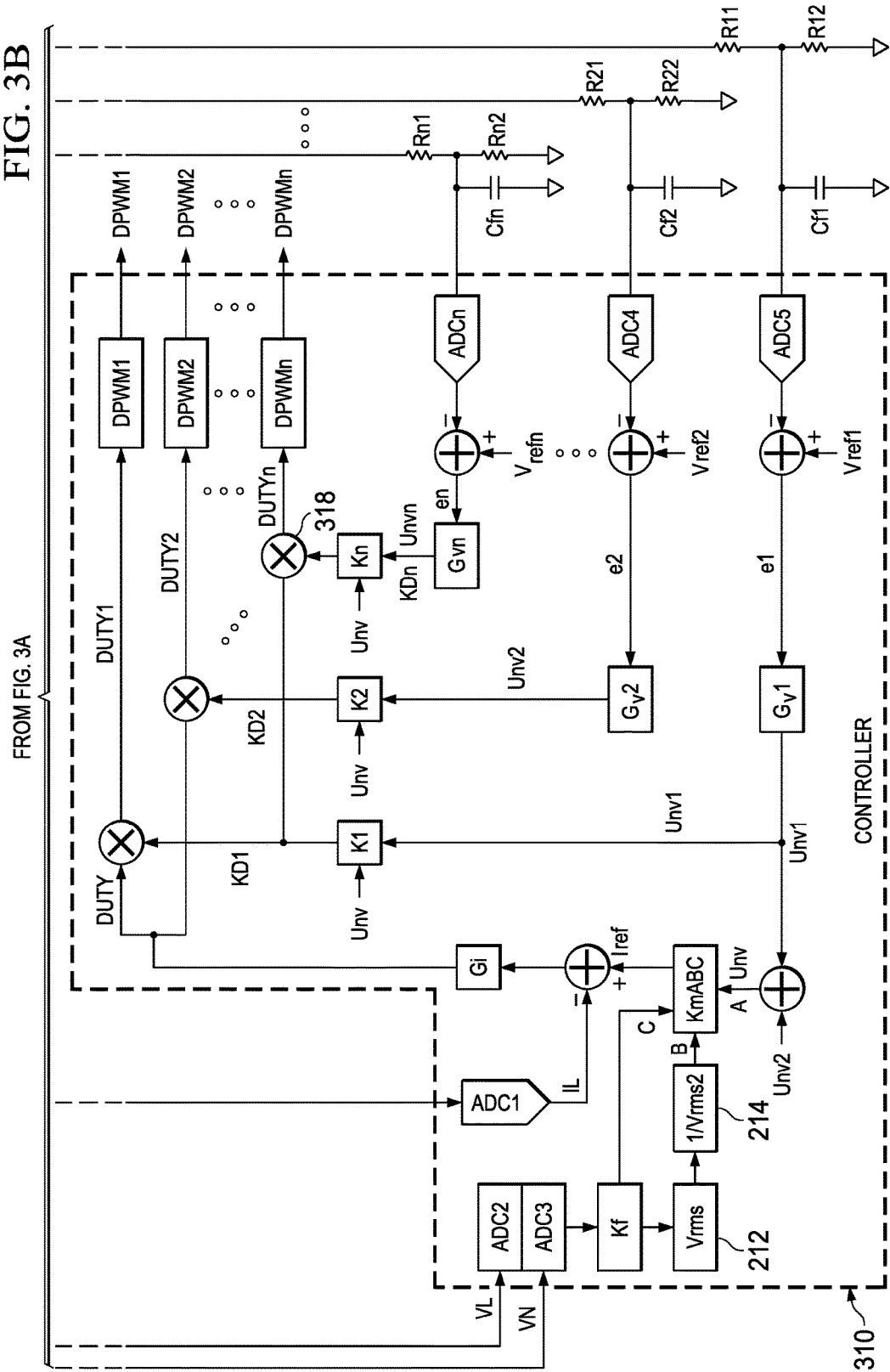
FIG. 3B is a schematic diagram illustrating an n-output power factor correction controller circuit in accordance with example embodiments of the disclosure.

FIG. 3 is a schematic diagram illustrating an n-output power factor correction controller circuit in accordance with example embodiments of the disclosure. Generally described, the PFC controller circuit 300 includes a power supply 302 and a controller 310. The controller 310 is arranged to monitor a current and voltages of the power supply 302 and to provide control signals used to shape respective waveforms of the output voltages of the power supply 302.

The power supply 302 is coupled to a power source such as alternating current source that provides electrically transmitted power using sinusoidal current and voltages. The power source is coupled to a full-wave rectifier that includes diodes D11, D12, D21, and D22. The "high-side" output of the full-wave rectifier is coupled to an input of three or more coils such as represented by coils L1, L2, and Ln). Each such inductor stores electrical field energy for powering an individual voltage output of the power supply 302. The "low-side" output of the full-wave rectifier is coupled to a (e.g., analog) ground to which current sensor CS1 is coupled for the purpose of monitoring the current supplied by the full-wave rectifier through modulators Q1, Q2, . . . , Qn and through capacitors C1, C2, . . . , and Cn.

In addition to the first voltage source (includes coil L1, diode D1, modulator Q1, and capacitor C1. Modulator Q1 is responsive to a (for example) digital pulse-width modulation signal (DPWM1) to control a voltage level output by the first voltage source. The DPWM1 signal directs the modulator Q1 to selectively shunt current to ground, which thus selectively lowers and controls the voltage level of the output of the first voltage source. The capacitor C1 is arranged to integrate the voltage level of the output of the first voltage source (thus providing a stable voltage of a direct current), while diode D1 is arranged to isolate the voltage level of the output of the first voltage source from the coil L1 when the voltage level of the output of the first voltage source is higher than the instantaneous voltage level of the coil L1. The output of the first voltage source is coupled to (e.g., for the purpose of providing operational power) load 330.

Likewise, a second voltage source includes coil L2, diode D2, modulator Q2, and capacitor C2. Modulator Q2 is responsive to a (for example) digital pulse-width modulation signal (DPWM2) to control a voltage level output by the second voltage source. The DPWM2 signal directs the modulator Q2 to selectively shunt current to ground, which thus selectively lowers and controls the voltage level of the output of the second voltage source. The capacitor C2 is arranged to integrate the voltage level of the output of the second voltage source (thus providing a stable voltage of a direct current), while diode D2 is arranged to isolate the voltage level of the output of the second voltage source from the coil L2 when the voltage level of the output of the second voltage source is higher than the instantaneous voltage level of the coil L2. The output of the second voltage source is coupled to (e.g., for the purpose of providing operational power) load 332.

In addition to the first and second voltage sources, one (or more) additional voltages sources are illustrated. For example, an "n-th" voltage source (that illustrates the one or more additional voltage sources) includes coil Ln, diode Dn, modulator Qn, and capacitor Cn. Modulator Qn is responsive to a (for example) digital pulse-width modulation signal (DPWMn) to control a voltage level output by the n-th voltage source. The DPWM2 signal directs the modulator Q2 to selectively shunt current to ground, which thus selectively lowers and controls the voltage level of the output of the n-th voltage source. The capacitor Cn is arranged to integrate the voltage level of the output of the n-th voltage source (thus providing a stable voltage of a direct current), while diode Dn is arranged to isolate the voltage level of the output of the n-th voltage source from the coil Ln when the voltage level of the output of the n-th voltage source is higher than the instantaneous voltage level of the coil Ln. The output of the n-th voltage source is coupled to (e.g., for the purpose of providing operational power) load 334.

Controller 310 is an example of an n-output PFC controller having, for example, six sensing inputs and three control outputs to control three output voltage stages of the power supply 302. For example, the controller 310 includes an analog-to-digital converters ADC1 that is arranged to monitor a current sensing signal from the current sensor CS1, converters ADC2 and ADC3 that are arranged to monitor voltages of the alternating current source 304, and converters ADC4 and ADC5, each of which is respectively arranged to measure the output voltage (e.g., either Vo1 or Vo2) of each voltage source of power supply 302. To measure the output voltage Von, only the functionality of a single converter (such as converter ADCn) need be added. As discussed above, the functionality illustrated converters can be provided by less converters than shown, by using, for example time-multiplexed inputs on one or more ADCs. In operation (such as during test, calibration, and/or normal operation), the ADCs are respectively arranged to digitize each of the received input signals and to provide an indication of each input signal by generating a series of digitally coded values that correspond to the magnitude of the input signal at each sampling time.

As mentioned above, controller 310 includes an n-th PFC control stages where the n-th PFC control stage is arranged to receive an indication of an n-th output voltage of a power supply and, in response, generate a control signal for controlling the n-th output voltage of the power supply.

For example, the n-th PFC control stage output (e.g., voltage output Von) is coupled to a filter/divider network (that includes voltage-divider resistors Rn1 and Rn2 and filter capacitor Cfn) that is arranged to step-down and integrate the voltage Von. The ADCn is arranged to monitor the output of the filter/divider network and produce an n-th output voltage quantity that is an indication of the n-th output voltage of the power supply.

The n-th output voltage quantity is compared with a n-th voltage reference (Vrefn) that represents, for example a target quantity for the n-th output voltage quantity. The result of the comparison is expressed as error signal en. Error signal en is provided as an input to a first voltage loop digital controller (Gvn) in a similar fashion as discussed above with respect to equations (1) and (2). The output of the n-th voltage loop digital controller is expressed as signal Unvn (e.g., the n-th voltage loop error signal).

Signal A is calculated as the sum (e.g., combined output voltage error signal Unv) of the outputs of each voltage loop digital controllers. For example, signal A is equal to the value of signal Unv1 plus the value of signal Unv2 plus the value of signal Unvn. Signal A is supplied as an input to the module KmABC.

Module KmABC is arranged to receive the signals A, B, and C, and to generate a current reference signal (Iref) in response. For example, the module KmABC can be arranged in accordance with the equation (6) as described above. Thus, the current reference signal can be determined in response to instantaneous input voltages (e.g., signal C), the average voltage of the input voltage (signal B), the combined output voltage error signal (e.g., signal A), and the ratio of the maximum peak voltage to the minimum peak voltage.

The current reference signal Iref is added to a current loop signal IL to determine a combined error loop signal EL. Current loop signal IL is the output of the converter ADC1 that is arranged to monitor a current sensing signal from the current sensor CS1. The combined error loop signal EL is provided as an input to the current loop digital controller Gi. The output of the current loop digital controller Gi is expressed as signal Duty.

Signal Duty is modified in response to each of the individual voltage loop error signals (e.g., Unv1, Unv2, and Unvn) and collectively by the combined voltage loop error signal (e.g., Unv). For example, the n-th voltage loop error signal (Unvn) can be modified by the combined voltage loop error signal (Unv) and module Kn to produce signal KDn. Signal KDn is used to modify signal Duty at multiplier 318, which outputs signal Dutyn. Signal Dutyn is coupled to the input of an n-th duty pulse-width modulation (DPWMn) module. The DPWMn module is arranged to output a DPWMn signal that is configured to control the duty cycle of modulator Qn.

Figure 4:
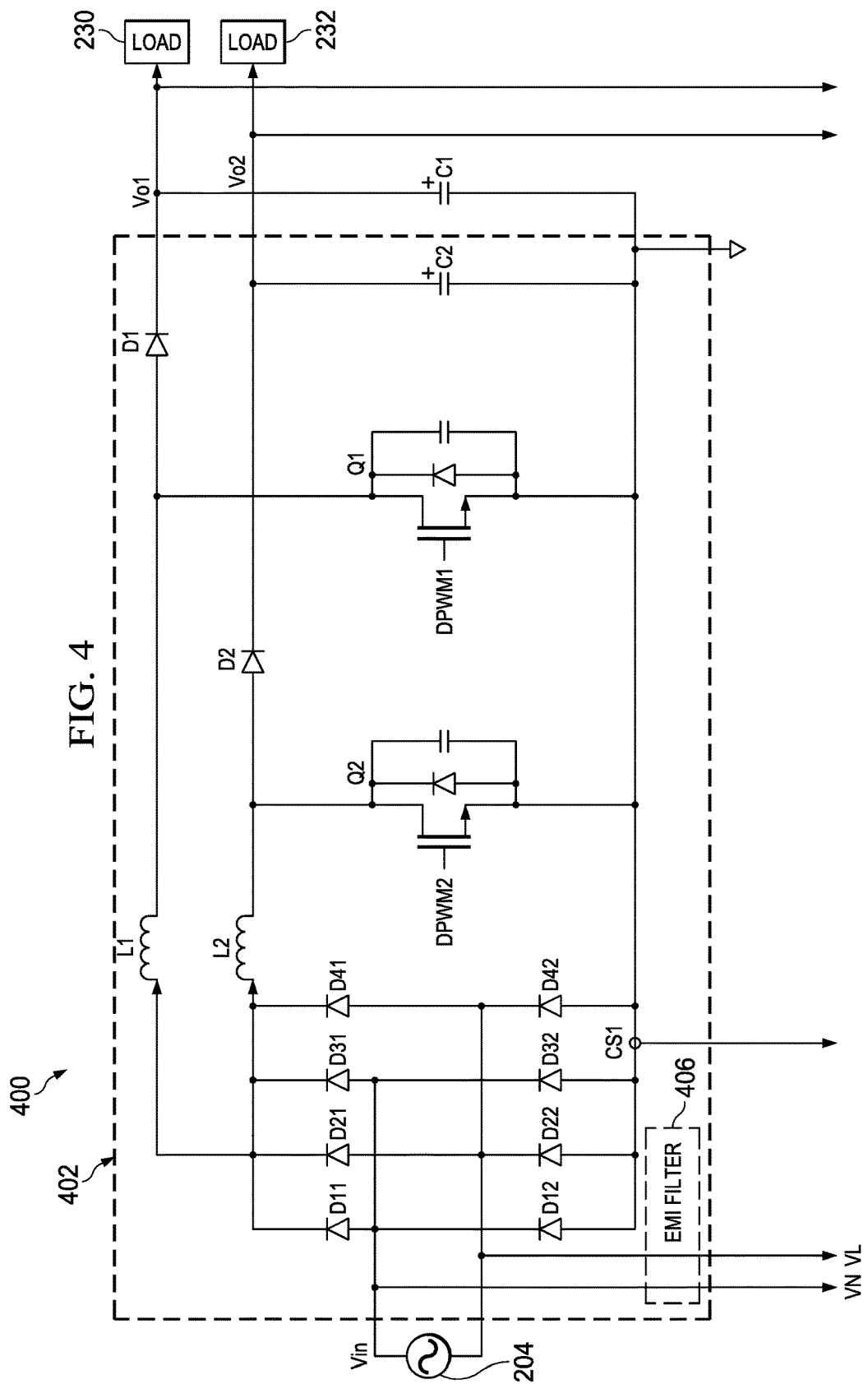
FIG. 4 is a schematic diagram illustrating an independent bridge power factor correction controller circuit in accordance with example embodiments of the disclosure.

FIG. 4 is a schematic diagram illustrating an independent bridge power factor correction controller circuit in accordance with example embodiments of the disclosure. Generally described, the PFC controller subsystem 400 includes a power supply 402. The power supply 402 is arranged to work with a controller such as controller 210.

The power supply 402 is coupled to a power source such as alternating current source 204 that provides electrically transmitted power using sinusoidal current and voltages. The power source is coupled to a first full-wave rectifier bridge that includes diodes D11, D12, D21, and D22 and to a second full-wave rectifier bridge that includes diodes D31, D32, D41, and D42. The "high-side" output of the first full-wave rectifier is coupled to an input of coil L1 and the "high-side" output of the second full-wave rectifier is coupled to an input of coil L2. Each such inductor stores electrical field energy for powering an individual voltage output of the power supply 402. The "low-side" output of the full-wave rectifier is coupled to a (e.g., analog) ground to which current sensor CS1 is coupled for the purpose of monitoring the total inductor current supplied through modulators Q1 and Q2 and through capacitors C1 and C2. Accordingly, the total inductor current can be monitored using a single terminal and/or signal.

The signals VN and VL are coupled to respective inputs of the first and second second full-wave rectifier bridges. The signals are also used to monitor the input voltage applied to the first and second full-wave rectifier bridges. The wires (e.g., conductors) used to convey the signals VN and VL are coupled in series with (optional) electromagnetic interference (EMI) filter 406. The EMI filter is arranged to filter electromagnetically induced noise from signals VN and VL. Because the EMI filter 406 is coupled in series with the conductor used to convey the signals VN and VL, no additional terminals need be provided.

The various embodiments described above are provided by way of illustration only and should not be construed to limit the claims attached hereto. Those skilled in the art will readily recognize various modifications and changes that could be made without following the example embodiments and applications illustrated and described herein, and without departing from the true spirit and scope of the following claims.

What is claimed is:

1. A power supply system, comprising:
a power supply that is electrically coupled to a substrate; and
a processor that is formed in the substrate and is arranged to monitor each voltage output of two or more output stages of the power supply and in response to generate an individual voltage error signal for each monitored output stage, is arranged to generate a combined output voltage error signal in response to each of the respective generated individual voltage error signals, is arranged to monitor a voltage input to the power supply and to monitor a total inductor current of the power supply and to generate a combined output voltage control signal in response to the monitored input voltage and the monitored total inductor current and the combined output voltage error control signal, and is arranged to generate an individual output voltage control signal for the each monitored output stage in response to the each of the respective generated individual voltage error signals.

2. The system of claim 1, wherein the monitored voltage input to the power supply is an alternating current.

3. The system of claim 1, wherein the processor is arranged to monitor the voltage input to the power supply via a respective first and second terminal, to monitor the total inductor current of the power supply via a third terminal, and to monitor arranged to monitor a first and second voltage output of two output stages of the power supply via a respective fourth and fifth terminal, the first, second, third, fourth, and fifth terminals each being arranged in the substrate.

4. The system of claim 3, wherein the processor is arranged to monitor a third voltage output of a third output stage of the power supply via a sixth terminal, the sixth terminal being arranged in the substrate.

5. The system of claim 3, wherein the voltage output of two or more output stages of the power supply is compared against a respective voltage reference to generate the each of the individual voltage error signals, wherein a current reference signal is generated in response to the monitored voltage input to the power supply and the combined output voltage error signal, and wherein the combined output voltage error control signal is generated in response to comparing the current reference signal and the monitored total inductor current of the power supply.

6. The system of claim 5, wherein each of the individual output voltage control signals is a pulse-width modulation signal that is arranged to control a respective modulator in each of the two or more output stages of the power supply.

7. The system of claim 6, wherein each respective modulator is coupled between an output of a respective inductor of the respective output stage of power supply and a ground of the power supply.

* * * * *